July 9, 1929.  C. H. H. RODANET  1,720,148
RECORDING METER
Filed Aug. 2, 1926
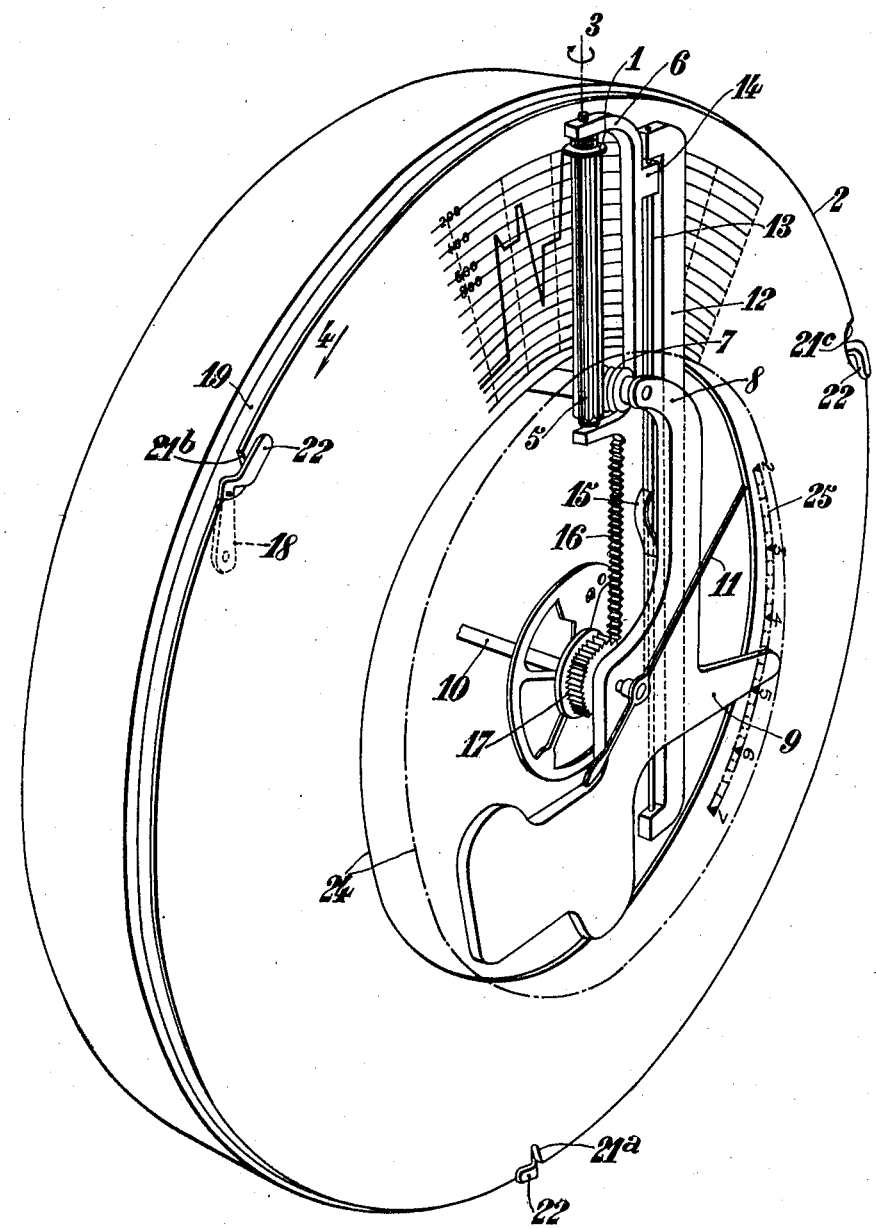
C. H. H. Rodanet
inventor
By: Marks & Clark
Attys.

Patented July 9, 1929.

1,720,148

UNITED STATES PATENT OFFICE.

CHARLES HILAIRE HENRI RODANET, OF VERSAILLES, FRANCE, ASSIGNOR TO SOCIETE ANONYME; ETABLISSEMENTS ED. JAEGER, OF PARIS, FRANCE, A COMPANY OF FRANCE.

RECORDING METER.

Application filed August 2, 1926, Serial No. 126,641, and in France September 25, 1925.

The present invention relates to improvements in recording devices and more particularly in tachometers in which a pointer indicates at every instant the speeds of a shaft in revolutions per minute for instance.

In certain recording meters, an annular sheet is provided which is caused to rotate concentrically to the axis of the pointer and a stylus, kinematically connected to the driving pivot of the pointer, moves in translation for radially marking on the sheet the points of ordinates corresponding to the various angular positions of the pointer and, consequently, to the speeds. In the known devices, the tracing stylus is constituted by a silver point which, by friction, leaves a grey tracing on the barytated surface of the paper. But owing to the small pressure exerted by the stylus on the paper the traces are often very weak or interrupted; it is impossible to increase the pressure without endangering the proper working of the apparatus.

The invention is adapted to remedy this serious inconvenience and, for that purpose, the improvements to which it relates are characterized in that the tracing stylus is constituted by a disc continuously rotating about its center and constantly tangent to the surface of the sheet, the linear speed displacement of the disc-stylus being greater than that of the diagram-sheet, the inscription is very much reinforced without increase of pressure; the angular connection of the sheet with its driving plate is effected by means of a tappet, its centering being obtained by frictional adjustment on a drum and stop fingers apply it on the surface of the said plate without however opposing itself to a certain angular movement relatively to the latter.

The accompanying drawing illustrates, by way of example only, a form of construction of an improved recording mechanism in accordance with the above features.

The single figure of the drawing is a front three quarter perspective view, showing the meter, the cover protecting the recording mechanism being removed.
The stylus is constituted by a disc 1 the periphery of which is rendered sufficiently thin for substantially constituting a line always tangent to the surface of the barytated sheet 2 on which it must trace the curve representing the speeds, during a predetermined period of time.

The stylus or disc 1 is rigidly secured on a pinion 5 having long teeth, journalled at its ends in the bearing portions of a frame 6 and constantly in gear with a worm 7 the continuous rotation of which derives from the mechanism of the meter by any suitable movable connection. The front end of the axis of the worm 7 is journalled in a bearing portion 8 of a frame 9 fixed relatively to the casing of the apparatus and in which is also journalled the shaft 10 carrying the pointer 11. A frame 12, also fixed, carries a rod which serves both as a slide and as pivoting axis for heel pieces 14 of the frame 6. A spring 15 interposed between the frames 12 and 6 acts to constantly press the disc 1 on the sheet of barytated paper 2.

The lower part of the frame 6 is cut in the shape of a rack 16 and constantly gears with a pinion 17 rigidly secured on the shaft 10 of the pointer 11. It will be seen that the disc 1 constantly rotates about its center and that its radial displacements relatively to the sheet 2 are a function of the angular displacements of the pointer 11 and, consequently, of the variations of the speeds to be recorded.

The assemblage of the sheet 2 on its support is effected as in the known arrangements, that is to say it is slidden under the stylus 3 lifted by hand. This sheet is held on its plate by means of three claws 22 entering into three notches 21$^a$—21$^b$—21$^c$, formed in the paper; these three claws 22 prevent the sheet from lifting, but only one of these claws drives it. In fact, only one of the notches 21$^a$ is narrow and fits on the claw; the two other notches 21$^b$ and 21$^c$ are much wider and do not touch the claws. The claws are adapted to be driven by a suitable clockwork in the usual manner, which mechanism has not been illustrated since it forms no part of my invention. The centering of the sheet 2 being effected by frictional adjustment on the flange 24 of the front protecting cover of the recording mechanism, it is obvious that the sheet will always move concentrically and without play relatively to the flange 24, whatever may be the centering of the plate and its position relatively to the said flange. The adjustment of the flange 24 is such that it actuates the friction sufficient for angularly joining the sheet 2 and the flange 24 in spite of efforts acting upon the sheet in order to turn it.

It is advantageous to use in this case thick graphic papers and even cardboard. The record sheet is of usual construction, having a plurality of concentric circles which indicate the speed corresponding to the position of disc 1 and a plurality of radial lines indicating the time of day for any given speed, all of which is well known in the art and need not be explained further.

It is obvious that the essential feature of the invention set forth in the foregoing, applies to forms of construction which can be very different from that illustrated by way of example only in the accompanying drawing. Of course, and as long as the above mentioned essential features are not altered, all these constructional modifications are included in the scope of the invention.

What I claim as my invention and desire to secure by Letters Patent is:—

1. In a recording tachometer having a time controlled record sheet and a speedometer shaft, the combination of a pinion on said shaft, a rack meshing with said pinion, means for pivotally and slidably mounting said rack in front of said record sheet, a circular stylus carried by said rack associated with said record sheet and means adapted to be driven by an element of said tachometer for rotating said stylus.

2. In a recording tachometer having a time controlled record sheet and a speedometer shaft, the combination of a pinion on said shaft, a rack meshing with said pinion, a fixed frame, a rod carried by said frame, means on said rack pivotally and slidably engaging said rod, a circular stylus carried by said rack associated with said record sheet and means adapted to be driven by an element of said tachometer for rotating said stylus.

3. In a recording tachometer having a time controlled record sheet and a speedometer shaft, the combination of a pinion on said shaft, a rack meshing with said pinion, means for pivotally and slidably mounting said rack in front of said record sheet, a circular stylus carried by said rack associated with said record sheet, an elongated pinion carried by said stylus and a worm meshing with said pinion, said worm being adapted to be driven by an element of said tachometer for rotating said stylus.

4. In a recording tachometer having a time controlled record sheet and a speedometer shaft, the combination of a pinion on said shaft, a rack meshing with said pinion, a fixed frame, a rod carried by said frame, means on said rack pivotally and slidably engaging said rod, a circular stylus carried by said rack associated with said record sheet, an elongated pinion carried by said stylus and a worm meshing with said pinion, said worm being adapted to be driven by an element of said tachometer for rotating said stylus.

In testimony whereof I have signed my name to this specification.

CHARLES HILAIRE HENRI RODANET.